US010807876B2

(12) United States Patent
Davoine et al.

(10) Patent No.: US 10,807,876 B2
(45) Date of Patent: Oct. 20, 2020

(54) PROCESS FOR THE JOINT PRODUCTION OF SODIUM CARBONATE AND SODIUM BICARBONATE

(71) Applicant: SOLVAY SA, Brussels (BE)

(72) Inventors: Perrine Davoine, Brussels (BE); Francis M. Coustry, Alsemberg (BE); Jean-Paul Detournay, Floreffe (BE); Kurt Allen, Green River, WY (US)

(73) Assignee: Solvay SA, Brussels (BE)

( * ) Notice: Subject to any disclaimer, the term of this patent is extended or adjusted under 35 U.S.C. 154(b) by 392 days.

(21) Appl. No.: 15/944,100

(22) Filed: Apr. 3, 2018

(65) Prior Publication Data
US 2018/0222759 A1    Aug. 9, 2018

Related U.S. Application Data

(63) Continuation of application No. 14/568,810, filed on Dec. 12, 2014, now abandoned, which is a
(Continued)

(30) Foreign Application Priority Data

May 13, 2008    (EP) .................................... 08156095

(51) Int. Cl.
C01D 7/10          (2006.01)
B01D 53/40         (2006.01)
(Continued)

(52) U.S. Cl.
CPC .............. C01D 7/10 (2013.01); B01D 53/40 (2013.01); C01D 7/00 (2013.01); C01D 7/126 (2013.01);
(Continued)

(58) Field of Classification Search
CPC . C01D 7/10; C01D 7/00; C01D 7/126; C01D 7/24; B01D 53/40; B01D 53/77;
(Continued)

(56) References Cited

U.S. PATENT DOCUMENTS 1,674,474 A    6/1928  Kuhnert
2,049,249 A    7/1936  Cunningham
(Continued)

FOREIGN PATENT DOCUMENTS

EP          5981 A1     12/1979
JP       4029926 A      1/1992
(Continued)

OTHER PUBLICATIONS

FMC technical data sheet for Sodium Bicarbonate USP Coarse Granular No. 5, FMC Corporation, Aug. 2005.
(Continued)

Primary Examiner — Daniel C. McCracken
(74) Attorney, Agent, or Firm — Beatrice C. Ortego

(57) ABSTRACT

Process for the joint production of sodium carbonate and sodium bicarbonate crystals, according to which: a solid powder derived from sodium sesquicarbonate, having a mean particle diameter comprised between 0.1 and 10 mm is dissolved in water; the resulting water solution is introduced into a crystallizer, wherein a first water suspension comprising sodium carbonate crystals is produced; the first water suspension is subjected to a separation, in order to produce crystals comprising sodium carbonate on the one hand, which are valorized, and a mother liquor on the other hand; and a part of the mother liquor is taken out of the crystallizer and put into contact in, a gas liquid contactor, with a gas comprising carbon dioxide, in order to produce a second water suspension comprising sodium bicarbonate crystals, which are separated and valorized. A reagent pow-
(Continued)

der comprising sodium bicarbonate crystals made by such process.

15 Claims, 1 Drawing Sheet

Related U.S. Application Data continuation of application No. 13/620,422, filed on Sep. 14, 2012, now abandoned, which is a continuation of application No. 12/991,350, filed as application No. PCT/EP2009/055722 on May 12, 2009, now Pat. No. 10,065,866, which is a continuation of application No. 12/126,651, filed on May 23, 2008.

(51) Int. Cl.
    *C01D 7/00* (2006.01)
    *C01D 7/12* (2006.01)
    *C01D 7/24* (2006.01)
    *B01D 53/77* (2006.01)

(52) U.S. Cl.
    CPC ............... *C01D 7/24* (2013.01); *B01D 53/77* (2013.01); *B01D 2251/304* (2013.01); *B01D 2251/606* (2013.01); *B01D 2257/2045* (2013.01); *B01D 2257/302* (2013.01); *B01D 2257/504* (2013.01); *Y02P 20/152* (2015.11)

(58) Field of Classification Search
    CPC ........ B01D 2251/304; B01D 2251/606; B01D 2257/2045; B01D 2257/302; B01D 2257/504; Y02P 20/152
    See application file for complete search history.

(56) References Cited

U.S. PATENT DOCUMENTS

| | | |
|---|---|---|
| 2,704,239 A | 3/1955 | Pike |
| 3,780,160 A | 12/1973 | Waggener et al. |
| 3,869,538 A | 3/1975 | Sproul et al. |
| 4,104,033 A | 8/1978 | Mahn et al. |
| 4,385,039 A | 5/1983 | Lowell et al. |
| 4,564,508 A | 1/1986 | Fairweather et al. |
| 4,654,204 A | 3/1987 | Copenhafer et al. |
| 5,169,615 A | 12/1992 | Jennings et al. |
| 5,262,134 A | 11/1993 | Frint et al. |
| 5,275,794 A | 1/1994 | Luna |
| 5,422,087 A | 6/1995 | Lajoie |
| 5,474,581 A | 12/1995 | Ninane et al. |
| 5,588,713 A | 12/1996 | Stevenson |
| 5,618,504 A | 4/1997 | Delling et al. |
| 5,624,647 A | 4/1997 | Zolotoochin et al. |
| 5,766,270 A | 6/1998 | Neuman et al. |
| 5,955,043 A | 9/1999 | Neuman et al. |
| 5,989,505 A | 11/1999 | Zolotoochin et al. |
| 6,171,567 B1 | 1/2001 | Fagiolini |
| 6,428,759 B1 | 8/2002 | Smith et al. |
| 6,475,458 B1 | 11/2002 | Phinney |
| 6,699,447 B1 | 3/2004 | Nielsen et al. |
| 2002/0054842 A1 | 5/2002 | Copenhafer et al. |
| 2003/0007923 A1 | 1/2003 | Copenhafer et al. |
| 2003/0017099 A1 | 1/2003 | Kurtz |
| 2003/0049192 A1 | 3/2003 | Braman et al. |
| 2003/0143149 A1 | 7/2003 | Braman et al. |
| 2003/0194434 A1 | 10/2003 | Watanabe et al. |
| 2004/0057892 A1 | 3/2004 | Kurtz |
| 2004/0197258 A1 | 10/2004 | Braman et al. |
| 2006/0039842 A1 | 2/2006 | Day et al. |
| 2006/0182675 A1* | 8/2006 | Ceylan .................... C01D 7/10 423/206.2 |
| 2011/0220565 A1 | 9/2011 | Mortensen et al. |

FOREIGN PATENT DOCUMENTS

| | | |
|---|---|---|
| JP | 4170315 A | 6/1992 |
| LI | 1562752 A | 1/2005 |
| SU | 66894 A1 | 8/1946 |
| WO | WO 94/23074 A1 | 10/1994 |

OTHER PUBLICATIONS

Fisher Chemical Catalog 2004/2005, pp. 202C-203C; 2 pgs.
[Unknown Author]. "Environmental Challenges and Progress in Canada's Oil Sands", 2008, Canadian Association of Petroleum Producers, Apr. 2008 (http://www.capp.ca/getdoc.aspx?DocID=135721); 16 pgs.

* cited by examiner

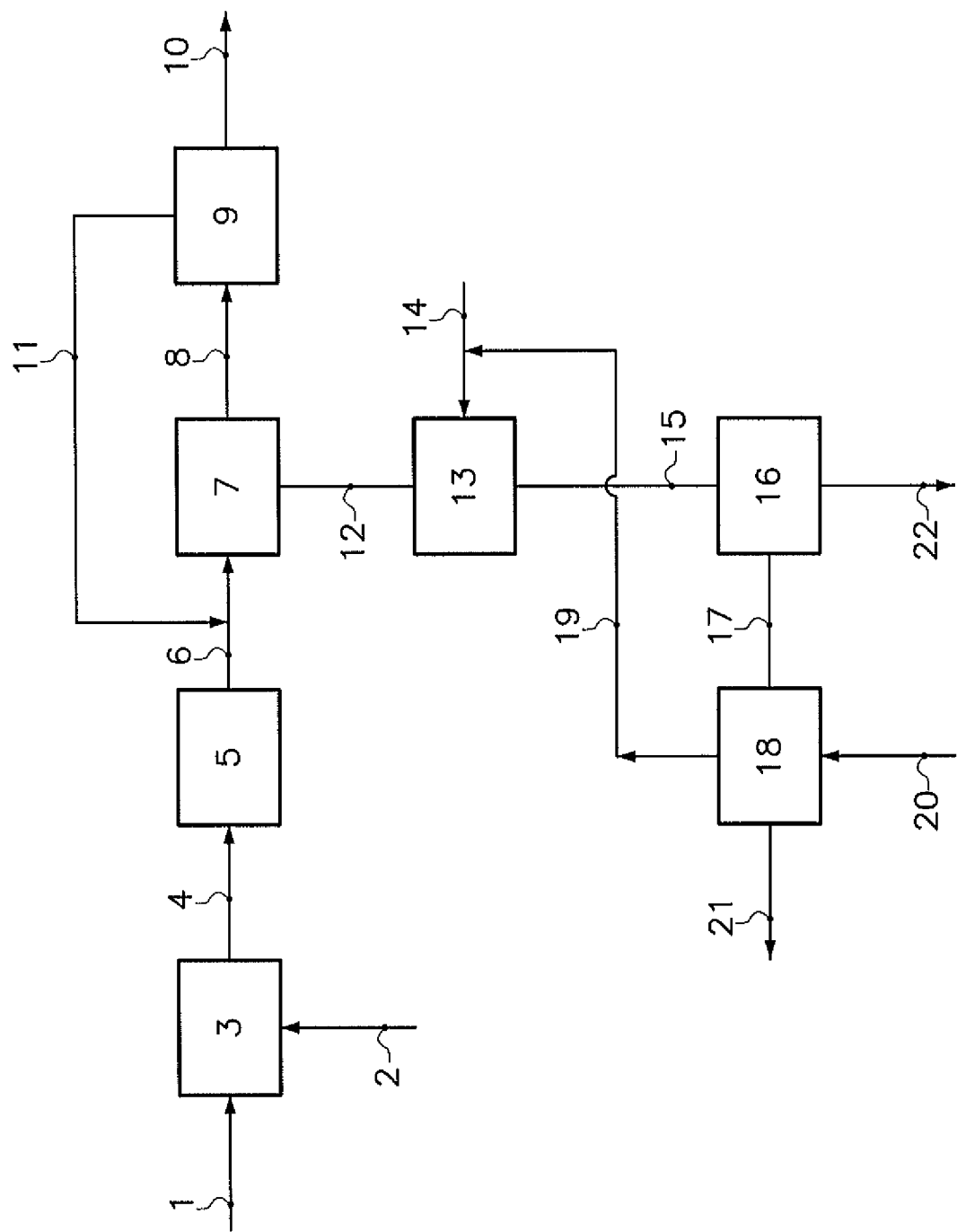

PROCESS FOR THE JOINT PRODUCTION OF SODIUM CARBONATE AND SODIUM BICARBONATE

CROSS-REFERENCE TO RELATED APPLICATIONS

The present patent application is a continuation of U.S. application Ser. No. 14/568,810 filed Dec. 12, 2014, itself a continuation of U.S. application Ser. No. 13/620,422 filed Sep. 14, 2012, the U.S. application Ser. No. 13/620,422 being now abandoned and being a continuation of U.S. application Ser. No. 12/991,350 which is a U.S. national stage application under 35 U.S.C. § 371 of International Application No. PCT/EP2009/055722 filed May 12, 2009, which is a continuation of U.S. patent application Ser. No. 12/126,651, filed May 23, 2008 and which claims priority benefit to European Patent Application No. 08156095.5 filed on May 13, 2008, the whole content of these applications being incorporated herein by reference for all purposes.

TECHNICAL FIELD OF THE INVENTION

This invention relates to a method for the joint production of sodium carbonate and sodium bicarbonate out of trona ore.

BACKGROUND OF THE INVENTION

Trona ore is a mineral that contains about 90-95% sodium sesquicarbonate ($Na_2CO_3 \cdot NaHCO_3 \cdot 2H_2O$). A vast deposit of mineral trona is found in southwestern Wyoming near Green River. This deposit includes beds of trona and mixed trona and halite (rock salt or NaCl) which covers approximately 2,600 $km^2$. The major trona beds range in size from less than 428 $km^2$ to at least 1,870 $km^2$. By conservative estimates, these major trona beds contain about 75 billion metric tons of ore. The different beds overlap each other and are separated by layers of shale. The quality of the trona varies depending on its particular location in the stratum.

A typical analysis of the trona ore mined in Green River is as follows:

TABLE 1

| Constituent | Weight Percent |
|---|---|
| $Na_2CO_3$ | 43.6 |
| $NaHCO_3$ | 34.5 |
| $H_2O$ (crystalline and free moisture) | 15.4 |
| NaCl | 0.01 |
| $Na_2SO_4$ | 0.01 |
| $Fe_2O_3$ | 0.14 |
| Insolubles | 6.3 |

The sodium sesquicarbonate found in trona ore is a complex salt that is soluble in water and dissolves to yield approximately 5 parts by weight sodium carbonate ($Na_2CO_3$) and 4 parts sodium bicarbonate ($NaHCO_3$), as shown in the above analysis. The trona ore is processed to remove the insoluble material, the organic matter and other impurities to recover the valuable alkali contained in the trona.

The most valuable alkali produced from trona is sodium carbonate. Sodium carbonate is one of the largest volume alkali commodities made in the United States. In 1992, trona-based sodium carbonate from Wyoming comprised about 90% of the total U.S. soda ash production. Sodium carbonate finds major use in the glass-making industry and for the production of baking soda, detergents and paper products.

A common method to produce sodium carbonate from trona ore is known as the "monohydrate process". In that process, crushed trona ore is calcined (i.e., heated) into crude sodium carbonate which is then dissolved in water. The resulting water solution is purified and fed to a crystallizer where pure sodium carbonate monohydrate crystals are crystallized. The monohydrate crystals are separated from the mother liquor and then dried into anhydrous sodium carbonate. However, the soluble impurities contained in the trona ore, tend to accumulate into the crystallizer. To avoid build up of impurities, the mother liquor must be purged. The purge liquor, which represents important quantities for industrial monohydrate plants, is commonly sent to evaporative ponds. The significant quantity of alkali which is contained in the purge liquor is consequently lost. Moreover, the stocking of large quantities of purge liquors in evaporative ponds raise environmental problems, because of the scarce availability of new areas for stocking.

On the other side, sodium bicarbonate is a product with a wide range of interesting properties and a very wide range of applications from high tech ingredients for the pharma industry to the human food and animal feed, and to the use in flue gas treatment. In flue gas treatment sodium bicarbonate is most likely among the most efficient chemicals for the removal of a wide range of pollutants (most notably the acidic one), and its use is limited only by the competition of less efficient but much cheaper chemicals such as lime or even limestone.

The production of sodium bicarbonate is currently almost entirely made by the carbonation of sodium carbonate. In Europe, the carbonation is usually performed in situ in the soda ash plants from $CO_2$ coproduced during the production of soda ash (mainly the $CO_2$ generation in the lime kilns). In USA, the carbonation is usually made in separate plants which purchase independently the soda ash and the $CO_2$ and combine them.

Because of the nature of this most important process for the bicarbonate production, the price for bicarbonate is above the price of the soda ash. With such economics the uses of bicarbonate will always be limited by the competition of cheaper substitutes, most notably in the flue gas treatment.

US2003/0017099 discloses a process for the joint production of sodium carbonate and bicarbonate, according to which solid trona is dissolved in water and the resulting water solution is fed into a monohydrate crystallizer in order to produce sodium carbonate. The purge liquor is introduced into a decahydrate crystallizer and the decahydrate crystals converted into sodium bicarbonate. It has been observed that this process is not efficient when the purge liquor, depending on the trona source, contains high levels of impurities. In particular, the sodium chloride content of the trona ore can vary depending on the precise trona vein which is exploited. High levels of sodium chloride in the purge liquor prevent smooth crystallization of decahydrate.

SUMMARY OF THE INVENTION

The invention aims on one side at reducing the amount of alkali lost in the evaporative ponds and on the other side at producing bicarbonate from trona in a smooth and inexpensive way, thereby opening new applications for the sodium bicarbonate.

Accordingly, the invention concerns a process for the joint production of sodium carbonate and sodium bicarbonate, wherein:
- a solid powder derived from sodium sesquicarbonate, having a mean particle diameter comprised between 0.1 and 10 mm is dissolved in water;
- the resulting water solution is introduced into a crystallizer, wherein a first water suspension comprising sodium carbonate crystals is produced;
- the first water suspension is subjected to a separation, in order to obtain crystals comprising sodium carbonate on the one hand, which are valorized, and a mother liquor on the other hand; and
- a part of the mother liquor is taken out of the crystallizer and put into contact with a gas comprising carbon dioxide, in order to produce a second water suspension comprising sodium bicarbonate crystals, which are separated and valorized.

BRIEF DESCRIPTION OF THE DRAWINGS

For a detailed description of the preferred embodiments of the invention, reference will now be made to the accompanying drawing in which:

FIG. 1 illustrates a process flow diagram of a process according to an embodiment of the present invention.

DETAILED DESCRIPTION OF THE PREFERRED EMBODIMENTS

The process according to the invention allows the joint production of sodium carbonate and sodium bicarbonate, out of sodium sesquicarbonate. Sodium sesquicarbonate containing intrinsically both sodium carbonate and bicarbonate, this process valorizes in an optimum way the raw materials which are consumed.

In the process according to the invention, solid powder derived from sodium sesquicarbonate is dissolved in water. The expression "derived from sesquicarbonate" means that the powder can consist essentially of sesquicarbonate, but can also consist of a product which results from a direct transformation of sesquicarbonate. For example, the transformation can be a calcination which transforms the sesquicarbonate essentially in sodium carbonate. The sesquicarbonate can have different origins. It can be produced artificially out of different sodium sources. However, it is recommended that sesquicarbonate comes from a natural trona ore. In this recommended embodiment purification of the water solution obtained after the dissolution of the solid powder in water will in general be necessary, in order to purify it from the main impurities contained in the ore. The purification generally involves settling and filtration steps, to allow insolubles to separate from the water solution. It also involves generally the use of reagents in order to remove organic matters still contained in the purified water solution. Active carbon is an example of such reagent.

The water in which the solid powder derived from sesquicarbonate is dissolved can be fresh water. However water has to be understood in a wide sense. The water can contain recycled water solutions already containing alkalis, coming from the process according to the invention or from other processes. The water can also comprise mother liquors (crystallization waters) produced downstream of the process according to the invention, when sodium carbonate and bicarbonate are crystallized, for instance. The process is also suited when the water is a mine water. By mine water is understood the water solution which is formed when water is directly injected into the trona ore deposits, whereby, on contact with the water, some ore dissolves in it.

The mean particle diameter of the powder which is dissolved in the water is comprised between 0.1 and 10 mm. Powders having a mean diameter below 0.1 mm frequently contain too much impurities, for instance when the sesquicarbonate is a trona ore, whereas powders having a mean diameter above 10 mm tend to be difficult to handle and dissolve in water. The mean diameter is the $D_{50}$ which is the diameter such that half of the particles, in weight, have a diameter lower than the specified value. For non spherical particles, the diameter is the equivalent one, that is six times the value of the volume of the particles divided by its external area.

The powder which derives from sesquicarbonate can consist essentially of sesquicarbonate and the impurities accompanying it, as in the embodiment wherein the source of sesquicarbonate is natural trona ore.

In a recommended embodiment of the invention, the powder derived from sesquicarbonate is calcined sesquicarbonate. In this embodiment, the sesquicarbonate is first calcined, preferably at a temperature comprised between 100 and 400° C., before its dissolution in water. During calcination, the sodium sesquicarbonate in the trona ore breaks down into sodium carbonate, carbon dioxide and water. Also, calcination releases some of the organics associated with trona or trona shale.

The quantity of powder derived from sesquicarbonate which is dissolved into water is regulated in order to obtain a resulting water solution containing enough sodium carbonate and bicarbonate to allow smooth crystallization of both chemicals in the later stages of the process. It is recommended that the resulting water solution contains at least 15%, preferably 20%, most preferably 25% in weight of sodium carbonate.

The crystallizer into which the resulting water solution is introduced must be able to crystallize sodium carbonate. The crystallized sodium carbonate can be in different hydration forms: monohydrate, decahydrate, . . . or can be anhydrous.

In a preferred embodiment of the invention, the sodium carbonate crystals produced in the crystallizer are in the monohydrate form. The crystallizer is then part of what is commonly referred to as the "monohydrate process". In the monohydrate process, crushed trona ore is calcined at a temperature between 125° C. and 250° C. to convert sodium bicarbonate into sodium carbonate and form crude soda ash. The resulting crude sodium carbonate and the remaining organics are then dissolved in water. After dissolving the calcined trona, any undissolved solids are removed and the solution is treated with activated carbon to remove some of the organics present in the solution. The solution is then filtered. One of the advantages of the monohydrate process is that calcined trona dissolves faster than raw trona. Another advantage is that calcined trona can produce more concentrated sodium carbonate solutions, whose concentrations can reach about 30%, while dissolved raw trona results into solutions having only about 16% sodium carbonate plus 10% sodium bicarbonate. The filtered solution of sodium carbonate is fed to an evaporative crystallizer where some of the water is evaporated and some of the sodium carbonate forms into sodium carbonate monohydrate crystals ($Na_2CO_3.H_2O$). A slurry containing these monohydrate crystals and a mother liquor is removed from the evaporators, and the crystals are separated from the mother liquor. The crystals are then calcined, or dried, to convert it to dense soda ash. The mother liquor is recycled back to the evaporator circuit for further processing into sodium carbonate monohydrate crystals.

In the process according to the invention, the composition of the mother liquor which is put into contact with carbon dioxide can vary according to the crystallization conditions. In general, it is recommended that the mother liquor contains a sufficient quantity of sodium carbonate.

In a recommended embodiment of the process according to the invention, the mother liquor contains at least 175 g/kg, preferably 190 g/kg, more preferably 205 g/kg, most preferably 220 g/kg of sodium carbonate. It is however recommended that the mother liquor does not contain more than 250 g/kg, preferably not more than 240 g/kg of sodium carbonate. It is also recommended that the mother liquor does not contain more than 30 g/kg, preferably 20 g/kg, more preferably 15 g/kg, most preferably 10 g/kg of sodium bicarbonate. It is additionally recommended that the mother liquor contains from 3 to 6, preferably from 4 to 5 equivalent/kg total alkali content. This means that one kg of mother solution contains advantageously from 3 to 6, preferably from 4 to 5 moles on ion Na+, whether coming from sodium carbonate or sodium bicarbonate.

The process according to the invention allows to directly produce fairly pure sodium bicarbonate crystals out of quite impure mother liquors. The mother liquor is even advantageously a purge stream from the crystallizer, used to maintain the concentration of impurities in the crystallizer below a threshold value.

In an advantageous embodiment of the invention, the mother liquor contains at least 10 g/kg, preferably 20 g/kg, most preferably 30 g/kg of NaCl.

In another advantageous embodiment of the invention, the mother liquor contains at least 1 g/kg, preferably 4 g/kg, most preferably 8 g/kg of $Na_2SO_4$.

In still another advantageous embodiment of the invention, the mother liquor contains at least 0.5 g/kg, preferably 0.6 g/kg of Si (counted as silica).

It is however recommended in those advantageous embodiments that the mother liquor does not contain more than 60 g/kg, preferably not more than 50 g/kg of sodium chloride. It is also recommended that the mother liquor does not contain more than 20 g/kg, more preferably 15 g/kg of sodium sulfate and not more than 1.5, preferably 1 g/kg of silica.

In those advantageous embodiments, it has been observed that the produced sodium bicarbonate crystals contain much less impurities than the mother liquor. It is advantageous that the crystals contain less than 0.1 g/kg $Na_2SO_4$, less than 1 g/kg NaCl and less than 5 g/kg silica.

In the process according to the invention, the gas comprising carbon dioxide must react efficiently with the mother liquor in the gas liquid reactor. To that end, it is recommended that the gas comprises at least 20% in weight, advantageously 40%, preferably 60%, more preferably 80% $CO_2$. It is particularly efficient to use pure (100%) $CO_2$. It is also recommended to use a well stirred gas liquid reactor, comprising a gas injector able to distribute the gas homogeneously into the reactor. The liquid constitutes advantageously the continuous phase inside the reactor, the gas being injected at the bottom and moving upwards. The reactor comprises preferably cooling means, to counteract the exothermicity of the reaction. The $CO_2$ can have different origins. In one recommended embodiment, the $CO_2$ comes from a natural gas plant, after having been concentrated for example through an amine process. Preferably, the $CO_2$ comes from the monohydrate soda ash plant, for instance from the calciners used to calcine the trona.

The temperature inside the gas liquid reactor is preferably between 60 and 80° C., more preferably between 65 and 75° C. The temperature of the mother liquor when it is introduced into the reactor is advantageously a little higher, preferably between 80 and 95° C.

In order to obtain a water suspension comprising enough sodium bicarbonate crystals, it is preferable to maintain a residence time in the gas liquid reactor greater than 10 minutes, more preferably greater than 20 minutes.

The (second) water suspension produced into the gas liquid reactor is subjected to a separation. The separation of the crystals from the suspension can be carried out by any appropriate mechanical separating means, for example by settling, by centrifugation, by filtration or by a combination of these three separating means. The sodium bicarbonate crystals are finally dried and packed.

The process according to the invention is particularly effective to produce crystals with a median diameter ($D_{50}$) between 75 and 250 μm, preferably between 80 and 150 μm. $D_{10}$ diameters are preferably between 40 and 100 μm, whereas $D_{90}$ diameters are preferably between 175 and 500 μm. $D_x$ is the diameter value such that x percent of the particles have a diameter lower than the value. When the particles have an approximately spherical shape, the diameter is the diameter of the particle. For irregular shapes, the diameter is six times the volume of the particle divided by its outer surface.

The sodium bicarbonate crystals produced by the process according to the invention have a very special structure: they contain impurities at a particular, however low, level. This level is higher than that of conventional sodium bicarbonate crystals for instance produced out of commercial sodium carbonate. Those impurities are a kind of memory in the bicarbonate crystals of the composition of the mother liquor. The usefulness of those impurities is not yet fully experienced, but their concentration corresponds to the level of many additives. Positive impact on storage and flowability of powders of such crystals can be expected. The crystals have also a unique granulometry. Moreover, they are extremely advantageous for many applications, in which cost is a major aspect.

The invention concerns also a reagent powder comprising sodium bicarbonate crystals obtainable by the process according to the invention. The crystals of such reagent powder comprise preferably from 0.1 to 1 g/kg NaCl, and/or from 0.01 to 0.1 g/kg $Na_2SO_4$ and/or from 0.5 to 5 g/kg silica.

Such reagent powders are particularly suited for the removal of pollutants from gases.

Consequently, the invention concerns also a process for treating a gas containing noxious pollutants, preferably HCl and/or $SO_2$ according to which a reagent powder according to the invention is injected in the gas, the pollutants react with the reagent and the product of the reaction is separated from the gas. The separation of the products of the reaction can most simply be performed by filtration, using bag filters or electrostatic filters. In this process, it is recommended that the temperature of the gas is above 100° C., preferably 110° C., more preferably 120° C., most preferably 130° C. At those temperatures, the sodium bicarbonate quickly decomposes into sodium carbonate having a high specific surface and thus high reactivity. The decomposition occurs within seconds, in the gas treatment duct. The reagent is injected in the dry or semidry state. By semidry state injection is understood injection of fine droplets of a water solution or preferably suspension of the reagent into a hot gas, having a temperature above 100° C. The solution or suspension evaporates immediately after its contact with the hot gas.

In the process for the joint production of sodium carbonate and sodium bicarbonate crystals according to the invention, the gas comprising $CO_2$ is preferably produced by indirect calcination of a composition releasing $CO_2$ upon calcination, preferably a composition comprising an alkali bicarbonate, more preferably sesquicarbonate or trona. Calcination of trona is advantageously operated between 140 and 180° C. By indirect calcination is meant calcination wherein the composition to be calcined is not in direct contact with the heat source utilized to warm the calciner. This is indeed the situation in conventional calciners, wherein the composition is in direct contact with the combustion gases produced by the burning fuel. In this embodiment, it is recommended to use steam heated calciners, wherein the steam is circulated into pipes, and the composition, preferably trona, is heated by contact with the exterior surface of the pipes. The steam is advantageously produced by electricity and steam cogeneration. It has been observed that the gas comprising $CO_2$ which is produced that way, after suitable drying for instance by a condensing step, has an elevated concentration in $CO_2$, typically more than 80% in volume, preferably more than 90%, most preferably more than 95%. The $CO_2$ has also a great purity. Thanks to those properties, a gas comprising $CO_2$ produced that way is especially suitable for the production of sodium bicarbonate out of a water solution comprising sodium carbonate.

Consequently, the invention concerns finally also a process for the production of sodium bicarbonate crystals, according to which:
- a composition releasing $CO_2$ upon calcination is indirectly calcined in order to produce a gas comprising $CO_2$,
- a water solution comprising sodium carbonate is put into contact, in a gas liquid contactor, with the gas comprising $CO_2$, in order to produce a water suspension comprising sodium bicarbonate crystals, which are separated.

In this process, the solution comprising sodium carbonate comprises preferably at least 175 g/kg of sodium carbonate, and the gas comprising $CO_2$ comprises at least 90% $CO_2$. The sodium carbonate is preferably produced by the monohydrate process described in this specification. Other preferred embodiments of the process for the joint production of sodium carbonate and sodium bicarbonate crystals described above are also advantageously adapted to this process for the production of sodium bicarbonate.

The annexed FIGURE (FIG. 1) illustrates a particular embodiment of the invention. Crushed sodium carbonate crystals 1, originating from calcined trona ore, and water 2 are introduced in a leaching tank 3. The resulting water solution, containing insolubles in suspension, is filtered and purified in a purification unit 5. The purified water solution 6 is introduced into a monohydrate crystallizer 7, wherein a suspension 8 containing sodium carbonate monohydrate crystals is produced. Those crystals 10 are separated from the suspension in a separator 9. The resulting mother liquor 11 is sent back to the crystallizer 7. A purge stream 12 from the crystallizer 7 is carbonated in a reactor 13, fed by carbon dioxide 14. A water suspension 15 comprising sodium bicarbonate crystals is extracted from the reactor 13. The crystals 22 are finally separated in a filter 16. The second mother liquor 17 is debicarbonated with vapor 20 and then sent to a storage pond. Carbon dioxide 19 is advantageously recycled.

EXAMPLES

Details and particularities of the invention will appear from the description of the following examples.

Example 1

Crushed trona ore originating from Wyoming was used as feed material in a monohydrate process for the production of sodium carbonate. Accordingly, the crushed trona ore was calcined at a temperature of 170° C. The resulting sodium carbonate was leached in a quantity regulated in order to get a water solution containing 30% (weight) of sodium carbonate. The resulting water solution was then filtered, purified and introduced into a crystallizer, according to the monohydrate process. A first water suspension comprising sodium carbonate monohydrate crystals was produced in the crystallizer. The suspension was submitted to a separation, resulting in sodium carbonate monohydrate crystals (which are further processed into dense anhydrous sodium carbonate crystals) on one side and a (first) mother liquor on the other side. Part of the mother liquor was then taken out of the crystallizer, as part of a purge stream. The composition of the mother liquor is given in TABLE 2. The mother liquor was stored in a tank and heated at 87° C. This mother liquor was introduced from the tank into a lab-scale, atmospheric pressure gas-liquid reactor, at a flow rate of 1.6 kg/h. The reactor was agitated and maintained at 70° C. A carbon dioxide gas stream (100% $CO_2$), saturated at about 40° C. was introduced into the reactor at a flow rate of 0.8 m$^3$/h and approximately atmospheric pressure. Residence time into the reactor was calculated as approximately 1 hour. A second water suspension comprising sodium bicarbonate crystals was produced and extracted from the bottom of the reactor. The crystals were separated from the suspension. The resulting second mother liquor had the composition given in TABLE 3. Size and composition of those crystals are given in TABLE 4.

Example 2

In Example 2, it was processed as in Example 1, except that another specimen of mother liquor was submitted to carbonation, with slightly higher alkali content. The residence time was also increased to 2 hours. The results are given in TABLES 2 to 4. The residual sodium carbonate content of the second mother liquor was much higher than in Example 1. The sodium bicarbonate crystals comprised also more fine particles (greater span).

Example 3

In example 3, it was operated as in Example 2 (2-hour residence time) and the same specimen of mother liquor was used than in Example 2, but was further slightly diluted with water, in order to bring its alkali content back to the value of Example 1. The results are given in TABLES 2 to 4. The residual sodium carbonate content of the second mother liquor was back to the value of Example 1.

Example 4

In Example 4, it is operated as in Example 1, except that the purge stream from the crystallizer is sent into a pilot scale reactor, at a flow rate of 320 kg/h. Carbon dioxide having a concentration of 75% is introduced into the reactor at a flow rate of 18.5 Nm$^3$/h, and at a pressure of 2.5 absolute bars. The crystals separated from the extracted suspension have approximately the same composition as those of Example 1. Their diameters have a $D_{10}$ of 60 μm, a $D_{50}$ of 120 μm and a $D_{90}$ of 200 μm.

TABLE 2

|  | Example 1 | Example 2 | Example 3 |
| --- | --- | --- | --- |
| $NaHCO_3$ | 9 g/kg | 14 g/kg | 9 g/kg |
| $Na_2CO_3$ | 229 g/kg | 239 g/kg | 229 g/kg |
| NaCl | 35 g/kg | 39 g/kg | 36 g/kg |
| $Na_2SO_4$ | 9 g/kg | 10 g/kg | 9 g/kg |
| Ca | 8 mg/kg | | |
| Mg | 0.7 mg/kg | | |
| Fe | 0.1 mg/kg | | |
| Al | 0.3 mg/kg | | |
| Si | 800 mg/kg | | |
| Total Organic Carbon | 613 mg/kg | | |
| $H_2O$ | 718 g/kg | 698 g/kg | 717 g/kg |

TABLE 3

|  | Example 1 | Example 2 | Example 3 |
| --- | --- | --- | --- |
| $NaHCO_3$ | 93 g/kg | 63 g/kg | 96 g/kg |
| $Na_2CO_3$ | 46 g/kg | 115 g/kg | 44 g/kg |
| NaCl | 39 g/kg | 45 g/kg | 32 g/kg |
| $Na_2SO_4$ | 10 g/kg | 12 g/kg | 7 g/kg |
| Ca | 0.5 mg/kg | | |
| Mg | 0.2 mg/kg | | |
| Fe | <0.04 mg/kg | | |
| Al | <0.04 mg/kg | | |
| Si | 400 mg/kg | | |
| Total Organic Carbon | 602 mg/kg | | |
| $H_2O$ | 812 g/kg | 765 g/kg | 821 g/kg |

TABLE 4

|  | Example 1 | Example 2 | Example 3 |
| --- | --- | --- | --- |
| $NaHCO_3$ | 977 g/kg | 989 g/kg | 985 g/kg |
| $Na_2CO_3$ | 18 g/kg | 9 g/kg | 10 g/kg |
| NaCl | 0.3 g/kg | | |
| $Na_2SO_4$ | 80 mg/kg | | |
| Ca | 23 mg/kg | 43 mg/kg | 37 mg/kg |
| Mg | 2.5 mg/kg | | |
| Fe | 0.4 mg/kg | | |
| Al | 1.0 mg/kg | | |
| Si | 2.6 g/kg | | |
| $D_{10}$ | 22 μm | 21 μm | 40 μm |
| $D_{50}$ | 89 μm | 80 μm | 110 μm |
| $D_{90}$ | 222 μm | 294 μm | 220 μm |
| Span | 2.2 | 3.4 | 1.6 |

We claim:

1. A method for reducing the amount of alkali lost in evaporative ponds which are fed with a purge liquor containing such alkali, comprising:
   contacting said purge liquor with a gas comprising carbon dioxide, said purge liquor being a part of a mother liquor taken out of a sodium carbonate crystallizer and comprising at least 175 g/kg sodium carbonate and at least 20 g/kg sodium chloride.

2. The method according to claim 1, wherein the sodium carbonate content in the mother liquor is not more than 250 g/kg.

3. The method according to claim 1, wherein the mother liquor does not contain more than 30 g/kg of sodium bicarbonate.

4. The method according to claim 1, wherein contacting said purge liquor with a gas comprising carbon dioxide produces a water suspension comprising sodium bicarbonate crystals.

5. The method according to claim 4, wherein sodium bicarbonate crystals are separated from the water suspension to form a second mother liquor.

6. The method according to claim 5, wherein the second mother liquor is debicarbonated with vapor and then sent to a pond.

7. A method for treating a purge stream containing sodium carbonate, comprising:
   treating said purge stream with gaseous carbon dioxide, said purge stream comprising at least 175 g/kg sodium carbonate and at least 20 g/kg sodium chloride.

8. A method for extending the life of tailings ponds produced from a soda ash purge stream containing sodium carbonate, which method comprises treating said purge stream with gaseous carbon dioxide, wherein said purge liquor is a part of a mother liquor taken out of a sodium carbonate crystallizer and comprising at least 175 g/kg sodium carbonate and at least 20 g/kg sodium chloride.

9. The method of claim 8, wherein the purge stream is treated prior to it being deposited in the tailings pond.

10. The method according to claim 1, wherein said purge liquor comprises at least 30 g/kg sodium chloride.

11. The method according to claim 5, further comprising drying said sodium bicarbonate crystals.

12. The method according to claim 7, wherein said purge stream comprises at least 30 g/kg sodium chloride.

13. The method according to claim 7, wherein treating said purge stream with said gas comprising carbon dioxide produces a water suspension comprising sodium bicarbonate crystals; wherein sodium bicarbonate crystals are separated from the water suspension to form a second mother liquor; and wherein said sodium bicarbonate crystals are dried.

14. The method according to claim 8, wherein said purge liquor comprises at least 30 g/kg sodium chloride.

15. The method according to claim 8, wherein treating said purge liquor with said gas comprising carbon dioxide produces a water suspension comprising sodium bicarbonate crystals; wherein sodium bicarbonate crystals are separated from the water suspension to form a second mother liquor; and wherein said sodium bicarbonate crystals are dried.

* * * * *